Oct. 26, 1965    L. SCHAFER    3,213,808
DIE FOR CHECKERBOARD PASTRY
Filed Aug. 21, 1963    2 Sheets-Sheet 1

Oct. 26, 1965 L. SCHAFER 3,213,808
DIE FOR CHECKERBOARD PASTRY
Filed Aug. 21, 1963 2 Sheets-Sheet 2

United States Patent Office 3,213,808
Patented Oct. 26, 1965

3,213,808
DIE FOR CHECKERBOARD PASTRY
Leonhard Schafer, 219 Miriam St., Bronx, N.Y.
Filed Aug. 21, 1963, Ser. No. 303,588
3 Claims. (Cl. 107—1)

This invention relates to an article of manufacture, a die, for the extrusion of pastry having a checkerboard pattern therein.

It is an object of this invention to provide a die for the simultaneous extrusion of three streams of pastry dough in parallel bonded relationship.

It is another object to provide a method for bonding extruded streams of pastry dough to yield a substantially integral extruded rod.

These and other objects of this invention will become readily apparent upon reading the following descriptive illustrative disclosure taken in conjunction with the accompanying drawings in which.

Figure 1:
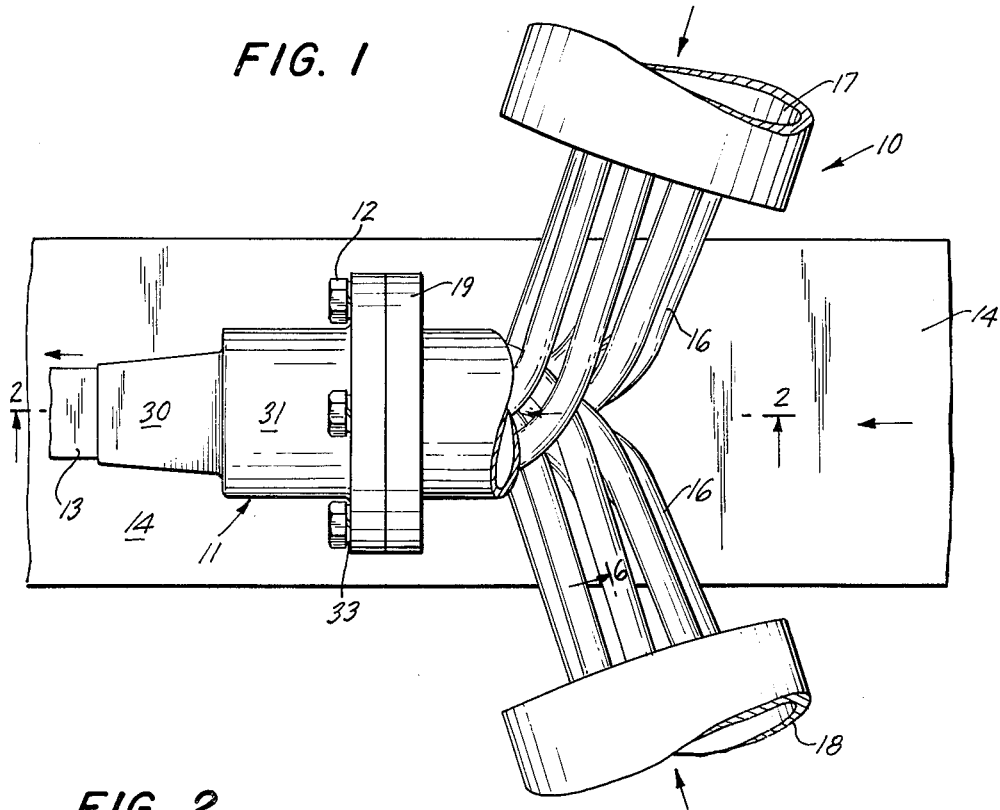
FIG. 1 is a top plan view of the assembled two piece die.

The production of inlaid cookies of intricate design by hand is impossible of economical accomplishment.

According to this invention, a checkerboard pattern of two pastry streams is bonded and then united to a third or a peripheral stream to yield a composite extruded rod.

Turning to the drawings a die element 10 for making the checkerboard design is secured to a jacket element 11 for adding the peripheral stream by means of a plurality of threaded bolts 12.

The extruded checkerboard rod 13 is continuously deposited on the moving conveyor 14 and cut at suitable lengths for storage in refrigerators to be later cut transversely into cookies and then baked.

Figure 4:
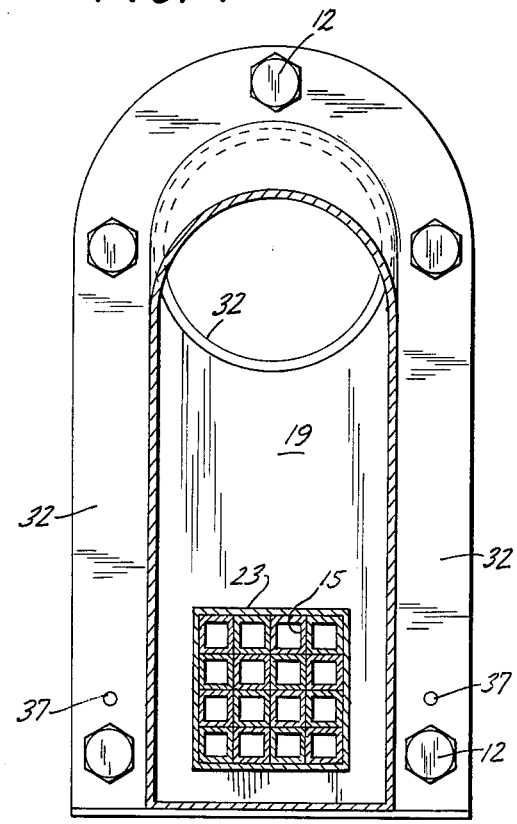
FIG. 4 is a transverse section view taken on line 4—4 of FIG. 2.

The die element 10 is provided with sixteen square tubes 15 which merge into round tubes 16 (FIG. 4).

As shown in the drawing eight of these tubes lead to a conduit 17 and the other eight to a conduit 18. Conduits 17 and 18 each contain a separate pastry dough of suitable consistency under high pressure.

The tubes 15 of conduit 17 are intermingled with the tubes 15 of conduit 18 in a pre-determined pattern and are then disposed in an aperture of upright wall 19.

Figure 6:
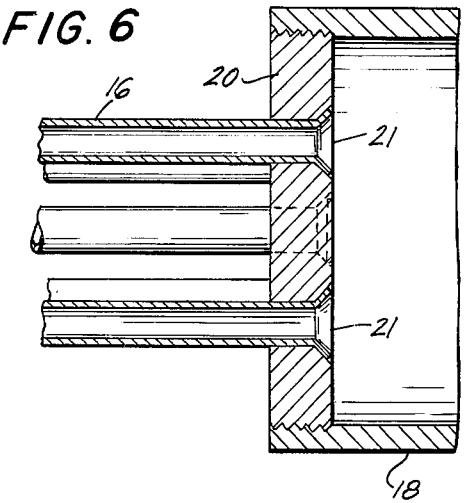
FIG. 6 is a transverse section view taken on line 6—6 of FIG. 1.

The intermingled tubes 15 are welded to wall 19 in a rigid liquid tight manner. The tubes 16 are secured to the correspondingly apertured end plate 20 of either conduit by means of flanged ends 21. The end plate 20 is threaded at its rim and screw threaded into the conduit 18 (FIG. 6).

Figure 2:
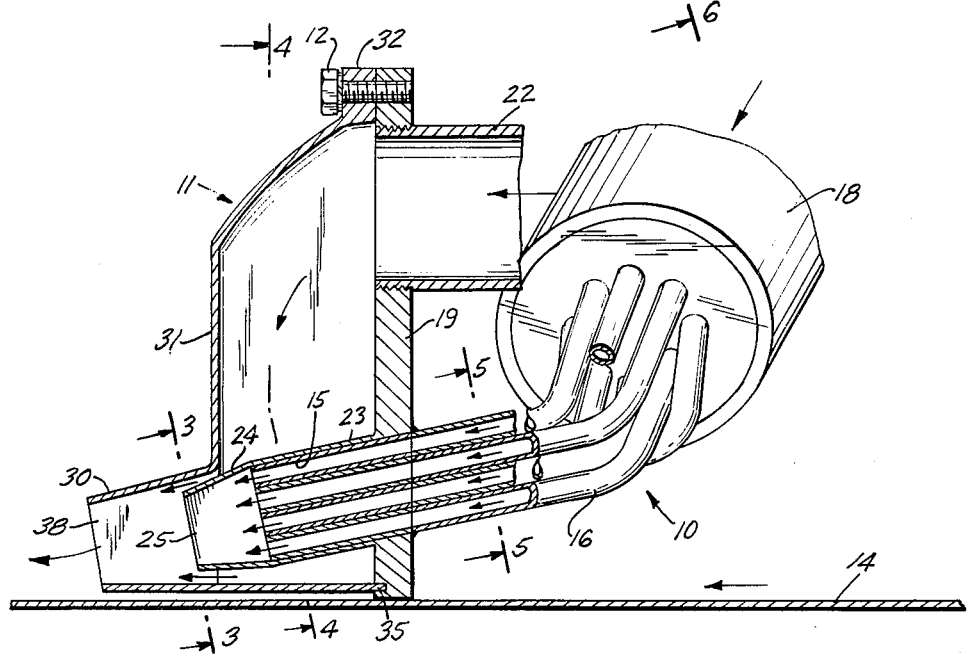
FIG. 2 is a longitudinal section view taken on line 2—2 of FIG. 1.
Figure 3:
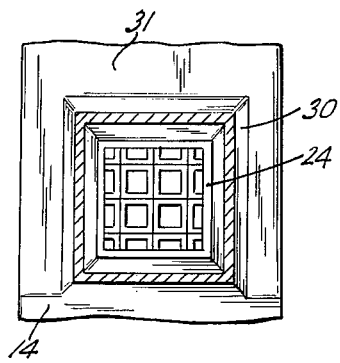
FIG. 3 is a transverse section view taken on line 3—3 of FIG. 2.
Figure 5:
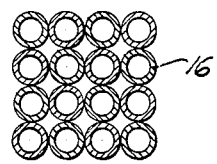
FIG. 5 is a transverse section view taken on line 5—5 of FIG. 2.

As shown in FIG. 2, the rigid wall 19 is provided with a large threaded aperture in which is screw threaded a conduit 22 in which the third stream of pastry dough, moves as shown by arrows, to form the periphery of the rod in element 11.

The wall 19 is provided at its inner face with a large tubular support 23 welded thereto. The support 23 is of a square cross section and snugly receives the square tubes 15.

The front of the support 23 is provided with an integral converging nozzle 24 of square cross section for gathering the many streams of dough issuing from the many square tubes 15 in the predetermined manner and compressing them into bonded relationship so that they issue out of the square orifice 25 of the nozzle 24 as an integral rod of a checkerboard design therein.

The jacket 11 is also provided with a square nozzle 30 integral with a cover-plate 31. Nozzle 30 of element 11 is of larger transverse area than nozzle 24 of element 10 and as shown in FIG. 2, the smaller nozzle 24 is disposed within nozzle 30.

The cover plate 31 is provided with a U-shaped flange 32 having suitable apertures therein to receive bolts 12. The bolts 12 are preferably secured to the cover plate 31 and the corresponding apertures in the support plate 19 by means of lock washers 33.

The plate 19 is provided with a bottom groove and a suitable ledge 35 of the flat bottom wall of the cover plate 31 is inserted thereinto for a pastry tight seal.

In order to align the cover plate 31 with the die element 10, the wall 19 is provided with a pair of pins 37 which are adapted to pass through corresponding pin receiving apertures disposed in the flange 32.

In the operation of the die of this invention a first stream of pastry chocolate dough is forced into conduit 17 and its corresponding tubes 16 and 15 into nozzle 24. A second stream of dough of another color and/or taste is forced through conduit 18 and its corresponding tubes 16 and 15 into nozzle 24 at the same speed as that of the chocolate stream.

The result is a commingling of the extruded square rods along their respective sides in nozzle 24 to form a bonded rod of checkerboard design issuing from the orifice 25 of nozzle 24.

A third stream of pastry dough of another or like color and/or taste in forced through conduit 22 into the jacket 11 and thence around nozzle 24 engaging the extruded rod issuing from orifice 25 in nozzle 30 to effect a strong bond thereto.

Figure 7:
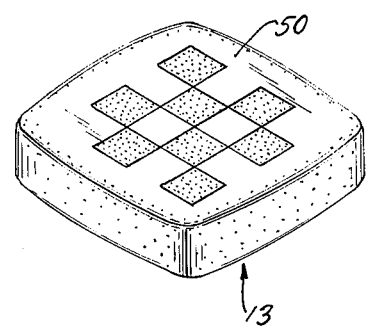
FIG. 7 is a fragmentary perspective view of the extruded end of the checkerboard rod.

As shown by means of the arrows indicating the flow of pastry dough, the streams from the square tubes (FIG. 2) issue in a parallel relationship and the rod from orifice 25 engages a substantially parallel flow of the third or peripheral stream of pastry dough 50 (FIG. 7).

This peripheral stream of suitable speed is compressed by nozzle 30 to engage the extruded rod from orifice 25 so that it is bonded thereto. The composite rod extruded from orifice 38 upon the moving conveyor 14 is therefore a substantially integral rod of composite design. Hence the cookies made therefrom when broken do not tend to break along the line or area of bonding.

As shown in FIG. 2 all the tubes 15 terminate in planar relationship so that the space formed by the tube walls is uniformly eliminated as the dough moves towards the orifice 25.

I claim:
1. A die for molding a checkerboard pattern from pastry dough comprising a first checkerboard design forming element having a vertical support wall having a bottom and a top aperture therein, a first group of tubes leading to a first common conduit, a second group of tubes leading to a second common conduit, said groups of tubes being intermingled by pre-selected checkerboard design and passed through said bottom aperture in a fluid tight manner, and a checkerboard forming square nozzle integral with said support wall and disposed over the intermingled ends of said tubes; and a jacket element adapted to be secured to said upright wall in fluid tight relationship, said jacket having a bottom square nozzle suitably disposed over said nozzle of said first element, whereby the third stream of pastry dough introduced into said jacket through said top aperture of said support wall forms a square peripheral ring of dough bonded to a checkerboard extruded rod.

2. The die of claim 1 wherein the tubes are round on one side of said support wall and are square on the other side of said wall and within said checkerboard forming square nozzle.

3. The die of claim 2 wherein all the square tubes terminate in a plane within said checkerboard forming nozzle at the base thereof.

References Cited by the Examiner

UNITED STATES PATENTS

| | | | |
|---|---|---|---|
| 797,276 | 8/05 | Glauser | 107—1 |
| 1,107,325 | 8/14 | Laskey | 99—138 |
| 1,281,592 | 10/18 | Laskey | 107—1 X |
| 3,129,673 | 4/64 | Stanley et al. | 107—1 |

WALTER A. SCHEEL, *Primary Examiner.*